United States Patent
Hoffmann

(10) Patent No.: US 10,840,529 B2
(45) Date of Patent: Nov. 17, 2020

(54) METHOD FOR GENERATING ENERGY AND ENERGY GENERATION DEVICE FOR MOBILE APPLICATIONS

(71) Applicant: Siemens Aktiengesellschaft, Munich (DE)

(72) Inventor: Joachim Hoffmann, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 47 days.

(21) Appl. No.: 16/062,718

(22) PCT Filed: Nov. 25, 2016

(86) PCT No.: PCT/EP2016/078791
§ 371 (c)(1),
(2) Date: Jun. 15, 2018

(87) PCT Pub. No.: WO2017/102285
PCT Pub. Date: Jun. 22, 2017

(65) Prior Publication Data
US 2018/0375137 A1    Dec. 27, 2018

(30) Foreign Application Priority Data
Dec. 16, 2015   (DE) .................. 10 2015 225 394

(51) Int. Cl.
*H01M 8/0612*    (2016.01)
*H01M 8/04089*   (2016.01)
(Continued)

(52) U.S. Cl.
CPC ............. *H01M 8/0618* (2013.01); *C01B 3/22* (2013.01); *H01M 8/04022* (2013.01);
(Continued)

(58) Field of Classification Search
CPC ......... H01M 2250/20; H01M 8/04022; H01M 8/04089; H01M 8/0612; H01M 8/0618; H01M 8/0631
See application file for complete search history.

(56) References Cited

U.S. PATENT DOCUMENTS

| 2001/0014414 A1 | 8/2001 | Okamoto et al. |
| 2007/0102285 A1 | 5/2007 | Isayama et al. |

(Continued)

FOREIGN PATENT DOCUMENTS

| CN | 102177086 | 9/2011 |
| CN | 103563149 | 2/2014 |

(Continued)

OTHER PUBLICATIONS

Office Action dated Mar. 29, 2019 issued in Australian Patent Application No. 2016369910.
(Continued)

*Primary Examiner* — Carlos Barcena
(74) *Attorney, Agent, or Firm* — Cozen O'Connor

(57) ABSTRACT

A method for generating energy in mobile applications, such as water vehicles, wherein hydrogen is produced by at least partially dehydrogenating a hydrogenated liquid organic hydrogen carrier (LOHC) in a chemical reactor, where electricity and water are generated in at least one fuel cell and heat for the chemical reactor is generated in a heating device from the produced hydrogen, and where the hydrogen produced by the chemical reactor is first conducted through the at least one fuel cell and then supplied to the heating device, such that the at least one fuel cell can therefore be operated under partial load and thus with better efficiency than if the hydrogen for the heating device is branched off before the fuel cell.

15 Claims, 3 Drawing Sheets

(51) Int. Cl.
*C01B 3/22* (2006.01)
*H01M 8/04014* (2016.01)
(52) U.S. Cl.
CPC ..... *H01M 8/04089* (2013.01); *H01M 8/0612* (2013.01); *H01M 8/0631* (2013.01); *C01B 2203/0266* (2013.01); *C01B 2203/04* (2013.01); *C01B 2203/066* (2013.01); *H01M 2250/20* (2013.01); *Y02E 60/324* (2013.01)

(56) References Cited

U.S. PATENT DOCUMENTS

| | | | |
|---|---|---|---|
| 2007/0231632 | A1 | 10/2007 | Zhao et al. |
| 2009/0081498 | A1* | 3/2009 | Kim ................ H01M 8/04201 429/494 |
| 2009/0293795 | A1* | 12/2009 | Schroder ................ B63G 8/08 114/338 |
| 2011/0195322 | A1 | 8/2011 | Ukai et al. |
| 2014/0053561 | A1 | 2/2014 | Liew et al. |
| 2014/0089055 | A1* | 3/2014 | Smith ................ G06Q 10/0631 705/7.36 |

FOREIGN PATENT DOCUMENTS

| | | |
|---|---|---|
| DE | 19947339 | 4/2001 |
| DE | 102008034221 | 1/2010 |
| DE | 102010042678 | 4/2012 |
| DE | 102012216669 | 3/2014 |
| DE | 102014006430 | 11/2015 |
| JP | 2001-229941 | 8/2001 |
| JP | 2002-008697 | 1/2002 |
| JP | 2004/256336 | 9/2004 |
| JP | 2005-063703 | 3/2005 |
| JP | 2005-298265 | 10/2005 |
| JP | 2006-095485 | 4/2006 |
| JP | 2009-264448 | 11/2009 |
| KR | 20090070837 | 7/2009 |
| WO | WO2012097925 | 7/2012 |
| WO | WO2014/044706 | 3/2014 |

OTHER PUBLICATIONS

PCT International Search Report and Written Opinion dated Jan. 31, 2017 corresponding to PCT International Application No. PCT/EP2016/078791 filed Nov. 25, 2016.

Teichmann, et al., "A Future Energy Supply Based on Liquid Organic Hydrogen Carriers(LOHC)," Energy & Environmental Science, vol. 4, 2011, pp. 2767-2773.

Office Action dated Jul. 21, 2020 issued in Chinese Patent Application No. 201680073485.4.

* cited by examiner

METHOD FOR GENERATING ENERGY AND ENERGY GENERATION DEVICE FOR MOBILE APPLICATIONS

CROSS-REFERENCE TO RELATED APPLICATIONS

This is a U.S. national stage of application No. PCT/EP2016/078791 filed Nov. 25, 2016. Priority is claimed on German Application No. 102015225394.5 filed Dec. 16, 2015, the content of which is incorporated herein by reference in its entirety.

BACKGROUND OF THE INVENTION

1. Field of the Invention

The invention relates to a method for generating energy and to an energy generation device.

2. Description of the Related Art

WO/2014/044706 disclosed an exemplary conventional method and energy generation device.

Electricity is generated with a high degree of efficiency in a fuel cell as a result of the electrochemical combination of hydrogen ($H_2$) and oxygen ($O_2$) at an electrode to form water ($H_2O$).

In mobile applications in particular, it is necessary to store the hydrogen required for the operation of fuel cells. This storage may be realized in a variety of forms, e.g., as compressed gas, in liquid form, via metal hydrides (e.g., aluminum, magnesium) or in the form of hydrogenated liquid organic compounds.

In the case of hydrogenated liquid organic compounds, these are used as hydrogen carriers. Aromatic compounds, particularly condensed polycyclic hydrocarbons, preferably find application as hydrogen carriers. For the hydrogenation process, hydrogen is loaded into the hydrogen carrier (hydrogenated) in a chemical catalyzed reaction. This loaded hydrogen can then be re-released in a chemical catalyzed back reaction and the aromatic compound recovered. Both the energy-rich hydrogenated form and the low-energy dehydrogenated form of the hydrogen carrier are referred to in the following as a "liquid organic hydrogen carrier" (LOHC).

This type of hydrogen storage has the advantage that it can be realized at high levels of energy density, in a maximally pressureless manner, and in the form of a low-flammability liquid, which makes it suitable in particular for mobile applications, such as on board underwater vehicles.

In the case of an underwater vehicle, the hydrogenated liquid organic hydrogen carrier can be brought on board by refueling from an external source, such as in a port. Alternatively, the hydrogenated liquid organic hydrogen carrier may also be produced on board the underwater vehicle by hydrogenation of the hydrogen carrier. The hydrogen required for the hydrogenation can then be generated by an electrolyzer, (see, e.g., WO 2012/097925 A1).

Thus, an arrangement and method for providing energy for vehicles are known from WO 2014/044706 A1, for example, where condensed polycyclic hydrocarbons are used as hydrogen carriers. These possess an extended π-conjugated electron system and are subject to a hydrogenation reaction at moderate temperatures in the presence of a suitable catalyzer. In this process, hydrogen is loaded (hydrogenated) into the substance through saturation of the unsaturated double bonds. The hydrogen incorporated via hydrogenation can subsequently be recovered from the hydrogenated product in a back reaction, with regeneration of the aromatic substance, simply by an increase in temperature and/or a reduction in the hydrogen pressure.

In this case, the hydrogen carrier is preferably selected from a group containing polycyclic aromatic hydrocarbons, polycyclic heteroaromatic hydrocarbons, π-conjugated organic polymers or a combination thereof.

In a particularly preferred embodiment, N-ethylcarbazole, N-n-propylcarbazole or N-iso-propylcarbazole is used as a low-energy substrate suitable for storing hydrogen.

WO 2014/044706 A1 discloses that it is furthermore likewise conceivable according to use non-heteroaromatic hydrocarbons. Thus, it is known that toluene substituted with at least two benzyl residues, such as dibenzyltoluene, may serve as a liquid hydrogen storage means. The benzyl residues may be present in substituted or unsubstituted form (the above-cited groups can act as substituent). Equally, the arrangement of the benzyl residues on the toluene ring may vary arbitrarily. The use of dibenzyltoluene (also known under the trade name Marlotherm SH) is particularly preferred.

In order to produce or release the hydrogen, the energy generation device disclosed in WO 2014/044706 A1 comprises a dehydrogenating assembly having a chemical reactor and a fuel cell. In the chemical reactor, hydrogen is produced by at least partial dehydrogenation of the liquid organic hydrogen carrier, and electricity and water are generated in the fuel cell from the produced hydrogen and from oxygen. In addition, heat for the chemical reactor is generated in a heating device (e.g., a catalytic combustor) from at least a part of the produced hydrogen.

SUMMARY OF THE INVENTION

Starting from the foregoing basis, it is an object of the present invention to provide a method and device for generating energy which achieve a higher level of efficiency in the generation of the electrical current.

This and other objects are achieved in accordance with the invention by a method and energy generation device and a water vehicle having such an energy generation device, wherein the hydrogen produced by the chemical reactor is first conducted through the at least one fuel cell and the fraction of hydrogen remaining after the fuel cell is then supplied to the heating device. The produced hydrogen is therefore not branched off and supplied to the heating device directly after the reactor, but is conducted via the "bypass route" of the at least one fuel cell. The reactor, the at least one fuel cell and the heating device for the reactor are accordingly connected in series with respect to the hydrogen flow. The produced hydrogen is thus conducted in its entirety through the at least one fuel cell. The at least one fuel cell can therefore be operated under partial load, i.e., with a stoichiometric hydrogen surplus, which leads to operation at a better level of efficiency and to a higher electrical power output than in the case where the hydrogen for the heating device is branched off beforehand and, as a result, the at least one fuel cell is operated with only a small stoichiometric hydrogen surplus or none at all.

Within the scope of the invention, the oxygen can in this case be present in (technically) pure form or also as part of a gas mixture (such as in the case of air), i.e., the at least one fuel cell can, within the scope of the invention, be operated with (technically) pure oxygen or with oxygen-containing gas mixtures.

Preferably, a volumetric flow supplied to the at least one fuel cell from the hydrogen produced by the reactor is controlled and/or regulated as a function of an electrical output power to be generated by the at least one fuel cell and a volumetric flow of hydrogen that is required for the heating device. This can be accomplished, for example, with the aid of one or more functions, value tables and/or measured values stored in a controller/regulator which describe the volumetric flow of hydrogen that is required for the at least one fuel cell and for the heating device (and consequently the volumetric flow of hydrogen to be supplied in total to the at least one fuel cell) as a function of the electrical output power to be generated.

Alternatively, in order to control and/or regulate the supply of hydrogen produced by the reactor to the at least one fuel cell, a pressure of the hydrogen after the latter has been conducted through the at least one fuel cell (i.e., at the output of the at least one fuel cell) or a temperature of the at least one fuel cell can be controlled and/or regulated as a function of an electrical power output to be generated by the at least one fuel cell and a volumetric flow of hydrogen produced by the reactor that is required for the heating device.

Instead of being controlled and/or regulated as a function of the volumetric flow of hydrogen required for the heating device, the supply of hydrogen may in this case also be controlled and/or regulated as a function of the temperature of the heating device.

In accordance with a particularly advantageous embodiment, the reactor comprises a plurality of subreactors that can be operated independently of one another and a distribution of the hydrogenated liquid organic hydrogen carrier supplied to the reactor to the individual subreactors is controlled and/or regulated as a function of an electrical power output to be generated by the at least one fuel cell. By controlling and/or regulating the number of operated subreactors, it is possible, for example, to bring the reactors operated in each case selectively into an operating point at which the heat generated by the heating device is used with maximum efficiency.

A yet further optimization of the efficiency by a yet further improvement in the utilization of the heat generated by the heating device is possible if the heating device comprises a plurality of heating subdevices that can be operated independently of one another, each of the heating subdevices being associated in each case with precisely one of the subreactors, and a distribution of the hydrogen supplied to the heating device to the individual heating subdevices being controlled and/or regulated as a function of an electrical power output to be generated by the at least one fuel cell. By controlling and/or regulating the distribution of the hydrogen to the individual heating subdevices, it is possible, for example, to bring the heating device selectively into an operating point at which the heat generated by the heating device is used with maximum efficiency in the reactor.

Preferably, both the distribution of the hydrogen supplied to the heating device to the individual heating subdevices and the distribution of the hydrogenated liquid organic hydrogen carrier supplied to the reactor to the individual subreactors are controlled and/or regulated such that the reactor is operated in an operating point at which the consumption of hydrogenated liquid organic hydrogen carrier is minimized.

Depending on the required electrical fuel cell performance or, as the case may be, the volume of hydrogen produced therefor, it is then possible, e.g., via valves, to control and/or regulate both the supply of hydrogenated liquid organic hydrogen carrier to the individual subreactors and the distribution of the available hydrogen to the individual heating subdevices, and consequently the supply of heat to the subreactors. In other words, where there is a lower requirement in terms of electrical fuel cell performance, a lower number of subreactors are supplied with hydrogenated liquid organic hydrogen carrier and a lower number of heating subdevices are supplied with hydrogen or, conversely, a higher number in each case where there is a higher requirement in terms of electrical fuel cell performance. At the rated load of the fuel cell, all subreactors and all heating subdevices are then in operation and are supplied accordingly with hydrogenated liquid organic hydrogen carrier or hydrogen.

In accordance with a further advantageous embodiment, before being supplied to the at least one fuel cell, the hydrogen produced by the chemical reactor is conducted through a gas cleaning device in which liquid organic hydrogen carrier entrained by the produced hydrogen is removed.

An energy generation device in accordance with the invention, in particular for mobile applications, comprises a chemical reactor for producing hydrogen by at least partial dehydrogenation of a hydrogenated liquid organic hydrogen carrier, at least one fuel cell connected to the chemical reactor for generating electricity and water from hydrogen produced by the reactor and from oxygen, and a heating device connected to the chemical reactor for generating heat for the chemical reactor from hydrogen produced by the reactor. In accordance with the invention, the reactor, the fuel cell and the heating device are connected in series with respect to the hydrogen flow such that the hydrogen produced by the chemical reactor is first conducted through the at least one fuel cell and then supplied to the heating device.

In accordance with an advantageous embodiment, the energy generation device comprises a controller/regulator that is configured to control and/or regulate a volumetric flow of hydrogen supplied to the at least one fuel cell as a function of an electrical power output to be generated by the at least one fuel cell and a volumetric flow of hydrogen required for the heating device. This can be accomplished for example with the aid of one or more functions, value tables and/or measured values stored in a control and/or regulating device that describe the volumetric flow of hydrogen required for the at least one fuel cell and for the heating device (and consequently the volumetric flow of hydrogen to be supplied in total to the at least one fuel cell) as a function of the electrical output power to be generated.

Alternatively, the energy generation device may comprise a controller/regulator which is configured to control and/or regulate a supply of hydrogen produced by the reactor to the at least one fuel cell by controlling and/or regulating a pressure of the hydrogen after the latter has been conducted through the at least one fuel cell (i.e., at the output of the at least one fuel cell) or by controlling and/or regulating a temperature of the at least one fuel cell as a function of an electrical power output to be generated by the at least one fuel cell and a volumetric flow of hydrogen produced by the reactor that is required for the heating device.

Instead of being controlled and/or regulated as a function of the volumetric flow of hydrogen required for the heating device, the supply of hydrogen may also be controlled and/or regulated as a function of the temperature of the heating device.

Preferably, the reactor comprises a plurality of subreactors that can be operated independently of one another and the controller/regulator is configured to control and/or regulate a distribution of the hydrogenated liquid organic hydrogen carrier supplied to the reactor to the individual subreactors as a function of an electrical power output to be generated by the at least one fuel cell. The distribution is controlled and/or regulated, for example, such that the reactor is operated in an operating point at which the heat generated by the heating device is used with maximum efficiency.

In accordance with a further advantageous embodiment, the heating device comprises a plurality of heating subdevices that can be operated independently of one another, each of the heating subdevices being associated in each case with precisely one of the subreactors, and the controller/regulator being configured to control and/or regulate the distribution of the hydrogen supplied to the heating device to the individual heating subdevices as a function of an electrical power output to be generated by the at least one fuel cell.

In accordance with a particularly advantageous embodiment, the controller/regulator is configured to control and/or regulate the distribution of the hydrogen supplied to the heating device to the individual heating subdevices and the distribution of the hydrogenated liquid organic hydrogen carrier supplied to the reactor to the individual subreactors such that the reactor is operated in an operating point at which the consumption of hydrogenated liquid organic hydrogen carrier is minimized.

Preferably, a gas cleaning device is arranged in the connection between the chemical reactor and the at least one fuel cell for the purpose of removing liquid organic hydrogen carrier.

The advantages cited for the method in accordance with the invention and its advantageous embodiments are applicable analogously to the device in accordance with the invention and each corresponding advantageous embodiments.

A particularly advantageous use of the invention lies in the field of mobility, in particular in relation to water vehicles, and in this case in particular in relation to water vehicles having air-independent propulsion drives, such as underwater vehicles (e.g., submarines, remotely operated vehicles, USVs).

A water vehicle in accordance with the invention, in particular an underwater vehicle, therefore comprises an energy generation device as explained in the foregoing.

In accordance with an advantageous embodiment, the water vehicle has a storage device for the hydrogenated liquid organic hydrogen carrier and an electric propulsion motor fed by the electricity generated by the at least one fuel cell for the purpose of driving the water vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and further advantageous embodiments of the invention according to features of the dependent claims are explained in more detail below with reference to exemplary embodiments illustrated in the figures. Parts corresponding to one another in the various figures are designated by the same reference characters in each case, in which.

DETAILED DESCRIPTION OF THE EXEMPLARY EMBODIMENTS

Figure 1:
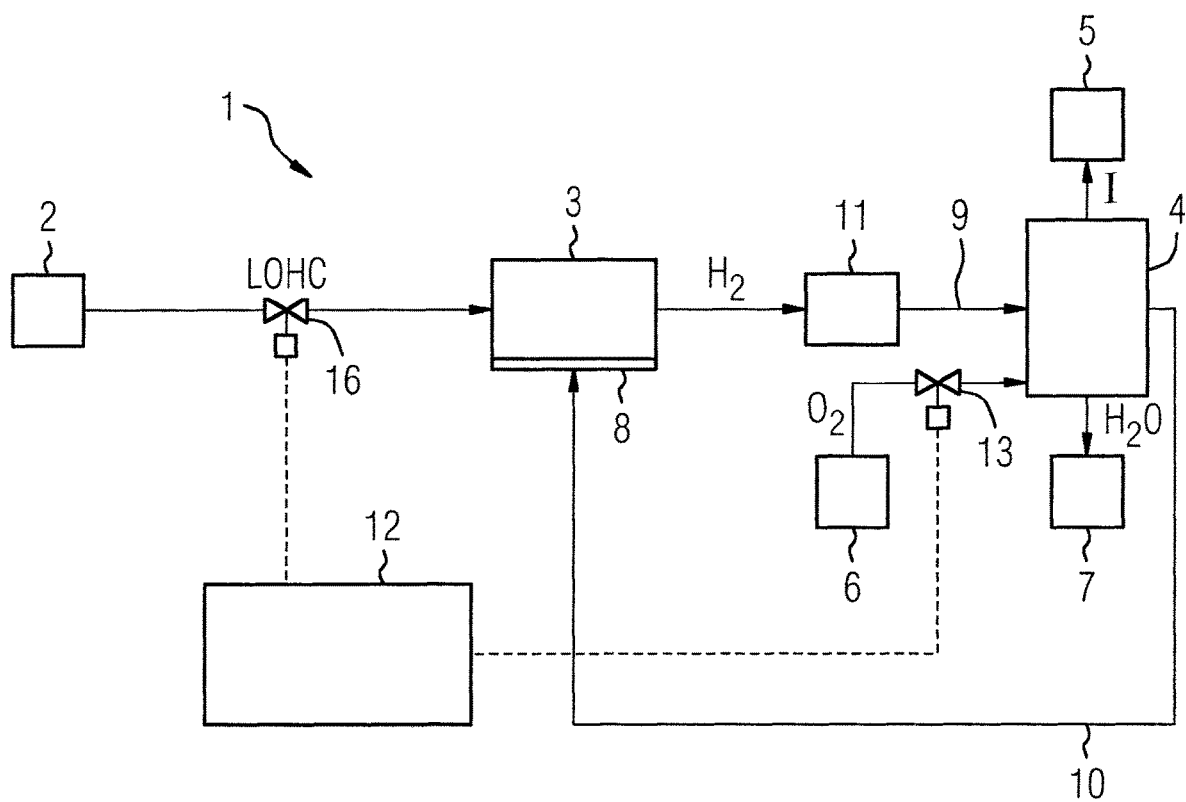
FIG. 1 shows a first embodiment of an energy generation device in accordance with the invention.

An inventive energy generation device 1 shown in FIG. 1 comprises a storage device 2 for a hydrogenated liquid organic hydrogen carrier (LOHC), a chemical reactor 3 for producing hydrogen by at least partial dehydrogenation of the hydrogenated liquid organic hydrogen carrier, and at least one fuel cell 4 connected to the chemical reactor 3 for generating electricity I for an electrical load 5 and water $H_2O$ from the produced hydrogen $H_2$ and from oxygen $O_2$. The oxygen $O_2$ is sourced in this case from a storage device 6, though it may also be taken from the ambient air in the event that the storage device 6 is eliminated. The produced water $H_2O$ is collected in a storage device 7. A heating device 8 thermally coupled to the chemical reactor 3 serves for generating heat for the chemical reactor 3 from the fraction of the produced hydrogen $H_2$ that is not consumed in the fuel cell 4. The heating device is, for example, a catalytic combustor that generates heat for the reactor 3 by burning hydrogen.

To supply the produced hydrogen $H_2$ to the heating device 8, the heating device 8 is connected to the chemical reactor 3 via the at least one fuel cell 4. For this purpose, the fuel cell 4 is connected to the reactor 3 via a connecting line 9 and the heating device 8 is connected to the fuel cell 4 via a connecting line 10. The reactor 3, the fuel cell 4 and the heating device 8 are therefore connected in series with respect to the hydrogen flow such that the hydrogen $H_2$ produced by the chemical reactor 3 is first conducted through the at least one fuel cell 4 and then supplied to the heating device 8.

A gas cleaning device 11 is arranged in the connecting line 9 between the chemical reactor 3 and the at least one fuel cell 4 for the purpose of removing liquid organic hydrogen carrier (LOHC).

A controller/regulator 12 is configured to control and/or regulate a volumetric flow of hydrogen $H_2$ produced by the reactor 3 that is supplied to the at least one fuel cell 4 as a function of an electrical power output to be generated by the at least one fuel cell 4 and a volumetric flow of hydrogen $H_2$ produced by the reactor 3 that is required for the heating device 8. This can be accomplished, for example, with the aid of one or more functions, value tables and/or measured values stored in the control and/or regulating device 12 that describe the volumetric flow of hydrogen required for the at least one fuel cell 4 and for the heating device 8 (and consequently the volumetric flow of hydrogen to be supplied in total to the at least one fuel cell 4) as a function of the electrical output power to be generated.

Alternatively, the controller/regulator 12 may also be configured to control and/or regulate a supply of hydrogen $H_2$ produced by the reactor 3 to the at least one fuel cell 4 by controlling and/or regulating a pressure of the hydrogen $H_2$ after the latter has been conducted through the at least one fuel cell 4 (i.e., at the output of the at least one fuel cell 4) or by controlling and/or regulating a temperature of the at least one fuel cell 4 as a function of an electrical power output to be generated by the at least one fuel cell 4 and a volumetric flow of hydrogen produced by the reactor 3 that is required for the heating device 8.

Instead of being controlled and/or regulated as a function of the volumetric flow of hydrogen $H_2$ required for the heating device 8, the supply of hydrogen may in this case also be controlled and/or regulated as a function of the temperature of the heating device 8.

For this purpose, the controller/regulator 12 controls and/or regulates the supply of oxygen $O_2$ to the fuel cell 4, and consequently the consumption of hydrogen $H_2$ in the fuel cell 4, via a valve 13, and the supply of hydrogenated liquid organic hydrogen carrier LOHC to the reactor 3 via a valve 16. Furthermore, the controller/regulator 12 may, in a manner not depicted in more detail, also control and/or regulate the supply of oxygen $O_2$ or oxygen-containing offgas of the at least one fuel cell 4 to the heating device 8.

During the operation of the energy generation device 1, hydrogen $H_2$ is then produced in the chemical reactor 3 by at least partial dehydrogenation of the hydrogenated liquid organic hydrogen carrier. This produced or released hydrogen is purged of entrained liquid organic compounds in the gas cleaning device 11 and then supplied to the at least one fuel cell 4, in which electricity I and water $H_2O$ are generated from the produced and supplied hydrogen $H_2$ and from the supplied oxygen $O_2$. Unconsumed hydrogen $H_2$ in the fuel cell 4 is supplied to the heating device 8 and heat for the chemical reactor 3 is generated therefrom.

The produced hydrogen $H_2$ is therefore not branched off and supplied to the heating device 8 directly after the reactor 3, but is conducted via the "bypass route" of the at least one fuel cell 4. The produced hydrogen $H_2$ is thus conducted in its entirety through the at least one fuel cell 4, thereby enabling the at least one fuel cell 4 to be operated under partial load, i.e., with a stoichiometric hydrogen surplus, which leads to operation of the at least one fuel cell 4 at a better level of efficiency and to a higher electrical power output than in the case where the hydrogen $H_2$ for the heating device 8 is branched off before the fuel cell 4 and, as a result, the at least one fuel cell 4 is operated with only a small stoichiometric hydrogen surplus or none at all.

Figure 2:
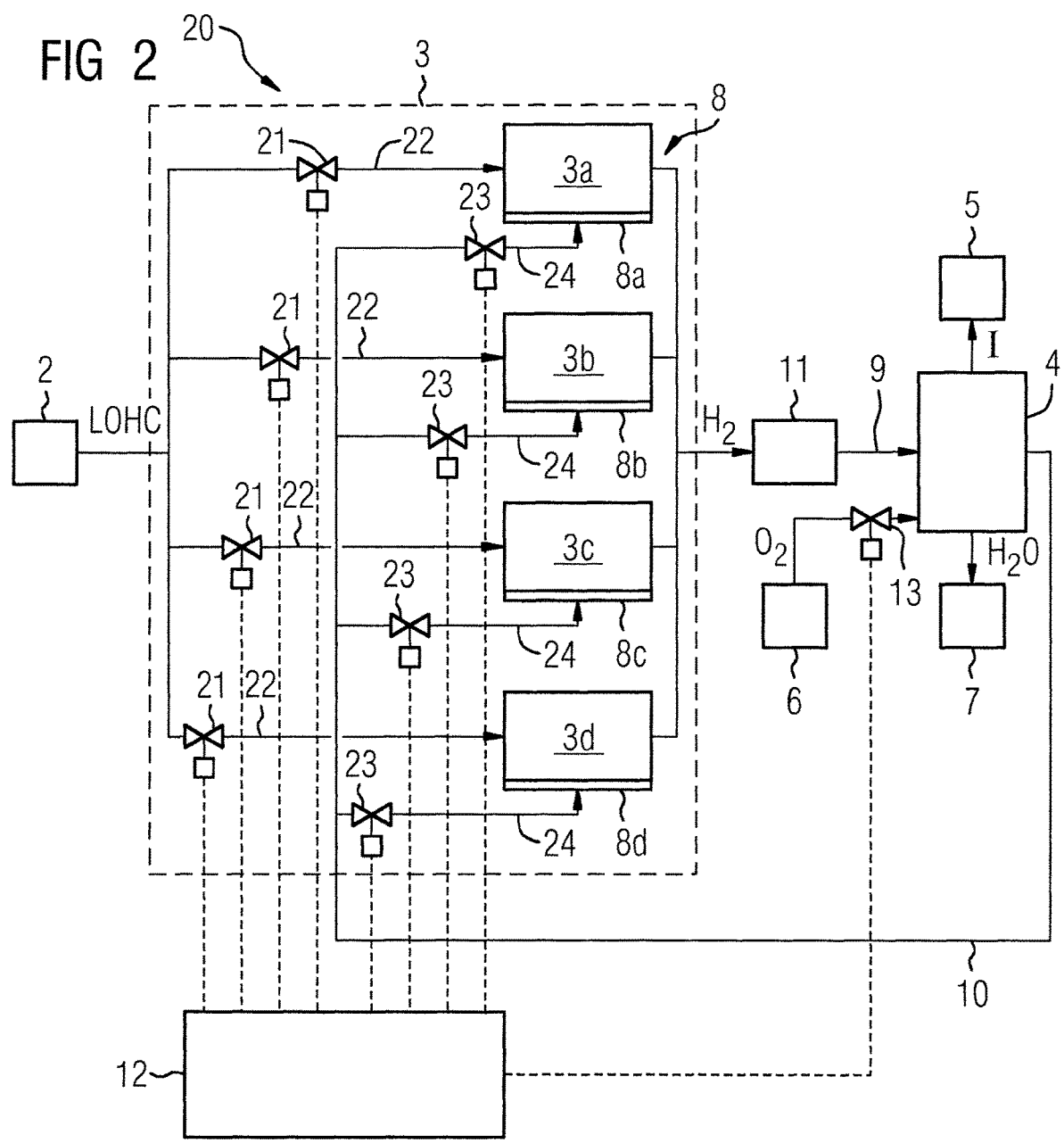
FIG. 2 shows a second embodiment of an energy generation device in accordance with the invention.

In a second embodiment of an energy generation device 20 in accordance with the invention shown in FIG. 2, the reactor 3 comprises a plurality of subreactors 3a, 3b, 3c, 3d that can be operated independently of one another in each case and the heating device 8 comprises a plurality of heating subdevices 8a, 8b, 8c, 8d that can be operated independently of one another in each case, where each of the heating subdevices 8a, 8b, 8c, 8d is associated with precisely one of the subreactors 3a, 3b, 3c, 3d.

For this purpose, the subreactors 3a, 3b, 3c, 3d are connected to the storage device 2 on the input side in each case via a separate line 22 provided with a controllable valve 21. Each of the valves 21 is controllable individually by the controller/regulator 12. Thus, the supply of hydrogenated liquid hydrogen carrier can be switched on or shut off individually for each of the subreactors 3a, 3b, 3c, 3d.

The heating subdevices 8a, 8b, 8c, 8d are each similarly connected to the connecting line 10 on the input side via a separate line 24 provided with a controllable valve 23. Each of the valves 23 is controllable individually by the control and/or regulating device 12. Thus, the supply of hydrogen $H_2$ can be switched on or shut off individually for each of the heating subdevices 8a, 8b, 8c, 8d.

A distribution of the hydrogenated liquid organic hydrogen carrier supplied to the reactor 3 to the individual subreactors 3a, 3b, 3c, 3d can then be controlled and/or regulated as a function of an electrical power output to be generated by the at least one fuel cell 4. For example, the reactor 3 can be brought in this way selectively into an operating point at which the heat generated by the heating device 8 is used with maximum efficiency.

The distribution of the hydrogen supplied to the heating device 8 to the individual heating subdevices 8a, 8b, 8c, 8d may also be controlled and/or regulated by the controller/regulator 12 as a function of an electrical power output to be generated by the at least one fuel cell 4 and by this means the heating device 8 brought for example selectively into an operating point in which the heat generated by the heating device 8 is used with maximum efficiency in the reactor 3.

Both the distribution of the hydrogen $H_2$ supplied to the heating device 8 to the individual heating subdevices 8a, 8b, 8c, 8d and the distribution of the hydrogenated liquid organic hydrogen carrier supplied to the reactor 3 to the individual subreactors 3a, 3b, 3c, 3d may also be controlled and/or regulated by the controller/regulator 12 such that the reactor 3 is operated in an operating point at which the consumption of hydrogenated liquid organic hydrogen carrier is minimized.

Depending on the required electrical fuel cell performance or, as the case may be, the volume of hydrogen then produced, it is then possible, via the valves 21, to control and/or regulate both the supply of hydrogenated liquid organic hydrogen carrier to the individual subreactors 3a, 3b, 3c, 3d and the distribution of the available hydrogen to the individual heating subdevices 8a, 8b, 8c, 8d, and consequently to the subreactors 3a, 3b, 3c, 3d. In other words, where there is a lower requirement in terms of fuel cell performance or when the energy generation device 1 is powered up, a lower number of subreactors 3a, 3b, 3c, 3d are supplied with hydrogenated liquid organic hydrogen carrier and a lower number of heating subdevices 8a, 8b, 8c, 8d are supplied with hydrogen or, conversely, a higher number in each case where there is a higher requirement in terms of fuel cell performance. At the rated load of the fuel cell 4, all subreactors 3a, 3b, 3c, 3d and all heating subdevices 8a, 8b, 8c, 8d are then in operation and are supplied accordingly with hydrogenated liquid organic hydrogen carrier or hydrogen.

Figure 3:
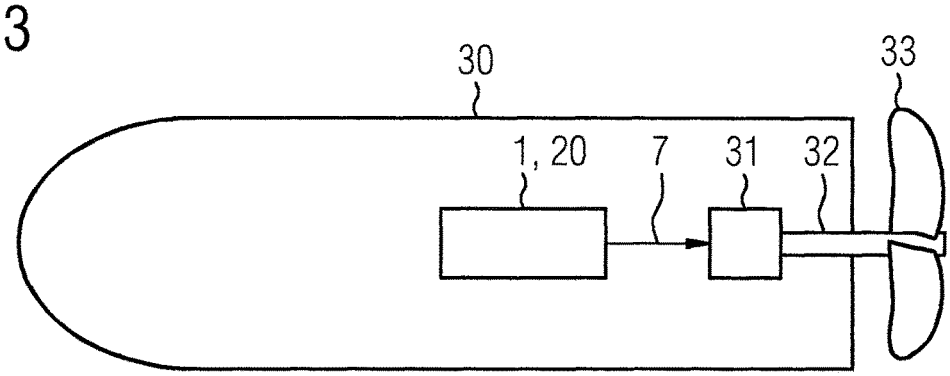
FIG. 3 shows a use of the energy generation device from FIG. 1 or 2 in an underwater vehicle.

FIG. 3 shows a use of the energy generation devices 1 from FIGS. 1 and 20 from FIG. 2 in an underwater vehicle 30, such as a submarine. The at least one fuel cell 4 (FIGS. 1 and 2) of the energy generation device 1 or 20 generates electricity I which feeds (if necessary, via inverters not shown in more detail) an electric propulsion motor 31 that drives a propeller 33 via a propeller shaft 32. In addition, it should be understood electrical current generated by the fuel cell 4 may also be used to supply other electricity-consuming loads on board the underwater vehicle 30 and for this purpose, for example, may be fed into an onboard electrical power supply system, or may be used to charge batteries or maintain them in a state of charge.

The hydrogenated liquid organic hydrogen carrier can, for example, be loaded into the storage device 2 (FIGS. 1 and 2) from an external source (e.g., in port). However, it is also possible for the liquid organic hydrogen carrier to be hydrogenated on board the underwater vehicle with the aid of a hydrogenation reactor. The hydrogen required for this can be produced, for example, via an electrolyzer that is operated with electricity from a generator which is driven via an internal combustion engine, e.g., when the underwater vehicle is running on the surface. Alternatively and/or in addition, it is also possible to use electricity from solar cells that are arranged or can be arranged on the outer hull of the underwater vehicle and can be operated when the underwater vehicle is at the surface of the water.

In this case, the hydrogen carrier is preferably selected from a group containing polycyclic aromatic hydrocarbons, polycyclic heteroaromatic hydrocarbons, π-conjugated organic polymers or a combination thereof.

In a particularly preferred embodiment, N-ethylcarbazole, N-n-propylcarbazole or N-iso-propylcarbazole is used.

Furthermore, the hydrogen carrier may be a toluene substituted with at least two benzyl residues, such as dibenzyltoluene. The benzyl residues may be present in substituted or unsubstituted form (the above-cited groups can act as substituent). Equally, the arrangement of the benzyl residues on the toluene ring may vary arbitrarily. The use of dibenzyltoluene (also known under the trade name Marlotherm SH) is particularly preferred.

Figure 4:
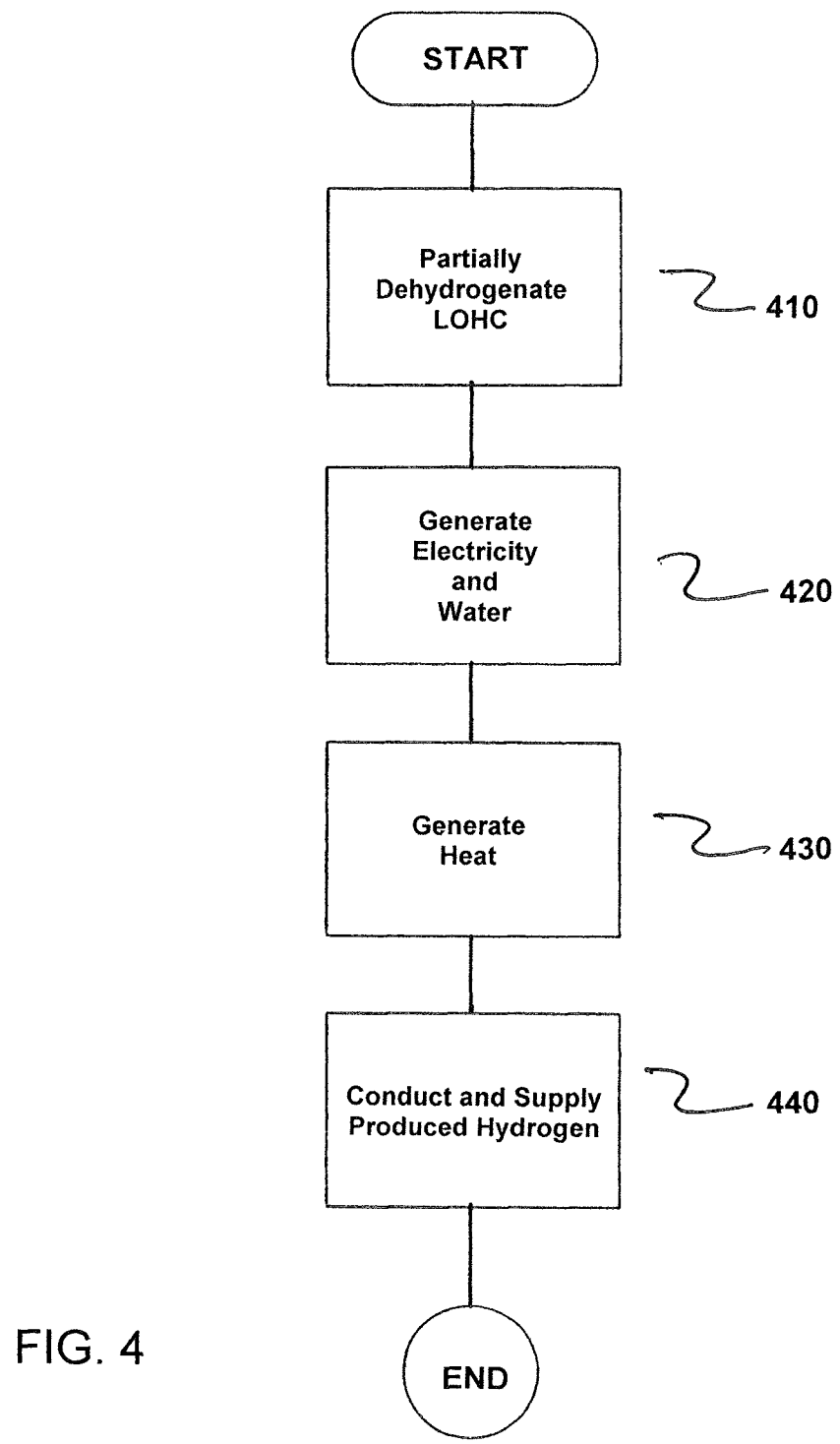
FIG. 4 is a flowchart of the method in accordance with the invention.

FIG. 4 is a flowchart of a method for generating energy for mobile applications. The method comprises partially dehydrogenating a hydrogenated liquid organic hydrogen carrier (LOHC) in a chemical reactor 3 to produce hydrogen, as indicated in step 410.

Next, electricity I and water $H_2O$ is generated in at least one fuel cell 4 from hydrogen $H_2$ produced by the chemical reactor 3 and from oxygen $O_2$, as indicated in step 420.

Heat for the chemical reactor 3 is now generated in a heating device 8 from hydrogen $H_2$ produced by the reactor 3, as indicated in step 430.

The hydrogen $H_2$ produced by the chemical reactor 3 is initially conducted through the at least one fuel cell 4 and then subsequently supplied to the heating device 8, as indicated in step 440.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for generating energy for mobile applications, comprising:
    partially dehydrogenating a hydrogenated liquid organic hydrogen carrier (LOHC) in a chemical reactor to produce hydrogen;
    generating electricity and water in at least one fuel cell from hydrogen produced by the chemical reactor and from oxygen;
    generating heat for the chemical reactor in a heating device from hydrogen produced by the reactor; and
    conducting the hydrogen produced by the chemical reactor through the at least one fuel cell and subsequently supplying the hydrogen conducted through the at least one fuel cell to the heating device;
    wherein a pressure of the hydrogen after being conducted through the at least one fuel cell and a temperature of the at least one fuel cell are at least one of (i) controlled and (ii) regulated as a function of an electrical power output to be generated by the at least one fuel cell and a volumetric flow of hydrogen produced by the chemical reactor which is required for the heating device to at least one of (i) control and (ii) regulate the supply of hydrogen produced by the chemical reactor to the at least one fuel cell; and
    wherein the volumetric flow of hydrogen produced by the chemical reactor which is supplied to the at least one fuel cell is at least one of (i) controlled and (ii) regulated by a controller/regulator as the function of the electrical power output to be generated by the at least one fuel cell and the volumetric flow of hydrogen produced by the chemical reactor which is required for the heating device.

2. The method as claimed in claim 1, wherein the chemical reactor comprises a plurality of subreactors which are operable independently of one another; and
    wherein a distribution of the hydrogenated liquid organic hydrogen carrier (LOHC) supplied to the chemical reactor to the individual subreactors of the plurality of subreactors is at least one of (i) controlled and (ii) regulated as the function of the electrical power output to be generated by the at least one fuel cell.

3. The method as claimed in claim 2, wherein the heating device comprises a plurality of heating subdevices which are operable independently of one another, wherein each heating subdevice of the plurality of heating subdevices is associated with precisely one of the subreactor of the a plurality of subreactors; and
    wherein a distribution of the hydrogen supplied to the heating device to individual heating subdevices of the plurality of heating subdevices is at least one of (i) controlled and (ii) regulated as the function of the electrical power output to be generated by the at least one fuel cell.

4. The method as claimed in claim 3, wherein the distribution of the hydrogen supplied to the heating device to the individual heating subdevices of the plurality of heating subdevices and the distribution of the hydrogenated liquid organic hydrogen carrier (LOHC) supplied to the chemical reactor to the individual subreactors of the plurality of heating subreactors is at least one of (i) controlled and (ii) regulated such that the chemical reactor is operated in an operating point at which consumption of hydrogenated liquid organic hydrogen carrier (LOHC) is minimized.

5. The method as claimed in claim 1, wherein the hydrogen produced is conducted through a gas cleaning device in which liquid organic hydrogen carrier (LOHC) entrained by the produced hydrogen is removed before being supplied to the at least one fuel cell.

6. An energy generation device for mobile applications, comprising:
    a chemical reactor for producing hydrogen by at least partial dehydrogenation of a hydrogenated liquid organic hydrogen carrier (LOHC);
    at least one fuel cell connected to the chemical reactor for generating electricity and water from hydrogen produced by the chemical reactor and from oxygen;
    a heating device thermally coupled to the chemical reactor for generating heat for the chemical reactor from hydrogen produced by the chemical reactor; and
    a controller/regulator which is configured to at least one of (i) control and (ii) regulate a volumetric flow of hydrogen produced by the chemical reactor which is supplied to the at least one fuel cell as a function of an electrical power output to be generated by the at least one fuel cell and a volumetric flow of hydrogen produced by the chemical reactor which is required for the heating device;

wherein the chemical reactor, the fuel cell and the heating device are connected in series with respect to the hydrogen flow such that the hydrogen produced by the chemical reactor is initially conducted through the at least one fuel cell and then supplied to the heating device; and wherein a pressure of the hydrogen after being conducted through the at least one fuel cell and a temperature of the at least one fuel cell are at least one of (i) controlled and (ii) regulated as a function of an electrical power output to be generated by the at least one fuel cell and the volumetric flow of hydrogen produced by the chemical reactor which is required for the heating device to at least one of (i) control and (ii) regulate the supply of hydrogen produced by the chemical reactor to the at least one fuel cell.

7. The energy generation device as claimed in claim 6, wherein the controller/regulator is further configured to at least one of (i) control and (ii) regulate the supply of hydrogen produced by the chemical reactor to the at least one fuel cell by one of (A) at least one of (i) controlling and (ii) regulating the pressure of the hydrogen after being conducted through the at least one fuel cell and (B) at least one of (i) controlling and (ii) regulating a temperature of the at least one fuel cell as the function of the electrical power output to be generated by the at least one fuel cell and the volumetric flow of hydrogen produced by the chemical reactor which is required for the heating device.

8. The energy generation device as claimed in claim 7, wherein the chemical reactor comprises a plurality of sub-reactors operable independently of one another; and wherein the controller/regulator is further configured to at least one of (i) control and (ii) regulate a distribution of the hydrogenated liquid organic hydrogen carrier (LOHC) supplied to the reactor to the individual subreactors of the plurality of subreactors as a function of the electrical power output to be generated by the at least one fuel cell.

9. The energy generation device as claimed in claim 6, wherein the chemical reactor comprises a plurality of sub-reactors operable independently of one another; and wherein the controller/regulator is further configured to at least one of (i) control and (ii) regulate a distribution of the hydrogenated liquid organic hydrogen carrier (LOHC) supplied to the reactor to the individual subreactors of the plurality of subreactors as a function of the electrical power output to be generated by the at least one fuel cell.

10. The energy generation device as claimed in claim 9, wherein the heating device comprises a plurality of heating subdevices operable independently of one another;

wherein each heating subdevice of the plurality of heating subdevices is associated with precisely one subreactor of the plurality of subreactors; and wherein the controller/regulator is further configured to at least one of (i) control and (ii) regulate the distribution of the hydrogen supplied to the heating device to the individual heating subdevices of the plurality of heating subdevices as the function of the electrical power output to be generated by the at least one fuel cell.

11. The energy generation device as claimed in claim 10, wherein the controller/regulator is further configured to at least one of (i) control and (ii) regulate the distribution of the hydrogen supplied to the heating device to the individual heating subdevices of the plurality of heating subdevices and the distribution of the hydrogenated liquid organic hydrogen carrier supplied to the chemical reactor to the individual subreactors such that the chemical reactor is operated in an operating point at which consumption of hydrogenated liquid organic hydrogen carrier (LOHC) is minimized.

12. The energy generation device as claimed in claim 6, further comprising:

a gas cleaning device arranged in the connection between the chemical reactor and the at least one fuel cell for removing liquid organic hydrogen carrier.

13. A water vehicle having the energy generation device as claimed in one of claim 6.

14. The water vehicle as claimed in claim 13, wherein the water vehicle is an underwater vehicle.

15. The water vehicle as claimed in claim 13, further comprising:

a storage device for the hydrogenated liquid organic hydrogen carrier (LOHC); and an electric propulsion motor fed by the electricity generated by the at least one fuel cell for driving the water vehicle.

* * * * *